United States Patent
Moll et al.

(10) Patent No.: US 7,577,443 B1
(45) Date of Patent: Aug. 18, 2009

(54) MOBILE-STATION AND MACRO-NETWORK-AIDED LOCATION DETERMINATION OF A LOW-COST INTERNET BASE STATION (LCIB)

(75) Inventors: Keith E. Moll, Olathe, KS (US);
Christopher M. Yenney, Ashburn, VA (US); William H. Deal, Stone Ridge, VA (US); Bryan T. Barbee, Olathe, KS (US); Timothy W. Sill, Platte City, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 11/960,987

(22) Filed: Dec. 20, 2007

(51) Int. Cl.
*H04Q 7/20* (2006.01)

(52) U.S. Cl. ............. 455/456.1; 455/456.2; 455/435.1; 455/450; 455/404.2; 455/441; 455/438; 370/328; 370/341

(58) Field of Classification Search ............. 455/456.1, 455/450, 441, 438, 437, 435.1, 456.2, 404.2; 370/328, 341
See application file for complete search history.

(56) References Cited

U.S. PATENT DOCUMENTS

| | | | |
|---|---|---|---|
| 5,528,247 A * | 6/1996 | Nonami | 342/357.1 |
| 5,736,962 A | 4/1998 | Tendler | |
| 7,117,015 B2 * | 10/2006 | Scheinert et al. | 455/561 |
| 7,221,928 B2 * | 5/2007 | Laird et al. | 455/404.1 |
| 7,272,121 B2 * | 9/2007 | Wilkes et al. | 370/331 |
| 2006/0072537 A1 * | 4/2006 | Lee et al. | 370/349 |
| 2006/0291427 A1 * | 12/2006 | Park | 370/332 |
| 2007/0135140 A1 * | 6/2007 | Tervo | 455/456.6 |
| 2008/0119160 A1 * | 5/2008 | Andriantsiferana et al. | 455/406 |

OTHER PUBLICATIONS

Unpublished U.S. Appl. No. 11/945,964, filed Nov. 27, 2007 in the name of Yenney et al.
Unpublished U.S. Appl. No. 11/954,072, filed Dec. 11, 2007 in the name of Talley et al.
Amundson, "Dead Reckoning for Consumer Electronics," 2006 Honeywell International.

* cited by examiner

*Primary Examiner*—Marceau Milord

(57) ABSTRACT

Methods and systems are provided for implementing mobile-station and macro-network-aided location determination of a low-cost Internet base station (LCIB). In an embodiment, a location of a mobile station that is associated with an LCIB is determined. The location of the mobile station is used to determine a location of the LCIB.

16 Claims, 5 Drawing Sheets

MOBILE-STATION AND MACRO-NETWORK-AIDED LOCATION DETERMINATION OF A LOW-COST INTERNET BASE STATION (LCIB)

BACKGROUND

1. Cellular Wireless Networks

Many people use mobile stations, such as cell phones and personal digital assistants (PDAs), to communicate with cellular wireless networks. These mobile stations and networks typically communicate with each other over a radio frequency (RF) air interface according to a wireless protocol such as Code Division Multiple Access (CDMA), perhaps in conformance with one or more industry specifications such as IS-95 and IS-2000. Wireless networks that operate according to these specifications are often referred to as "1xRTT networks" (or "1x networks" for short), which stands for "Single Carrier Radio Transmission Technology." Another protocol that may be used is known as Evolution Data Optimized (EV-DO), perhaps in conformance with one or more industry specifications such as IS-856, Release 0 and IS-856, Revision A. Other protocols may be used as well, such as Global System for Mobile Communications (GSM), Time Division Multiple Access (TDMA), WiMax, and/or any others.

These networks typically provide services such as voice, Short Message Service (SMS) messaging, and packet-data communication, among others, and typically include a plurality of base stations, each of which provide one or more coverage areas, such as cells and sectors. When a mobile station is positioned in one of these coverage areas, it can communicate over the air interface with the base station, and in turn over one or more circuit-switched and/or packet-switched signaling and/or transport networks to which the base station provides access.

The base stations for these networks are typically not associated with any subscriber or small group of subscribers in particular; rather, they are placed in publicly-accessible locations and are used by the service provider's customers generally. These base stations collectively blanket cities, rural areas, etc. with coverage; as such, they are referred to generally and herein as "macro (or macro-network) base stations" and the network they collectively form—or to which they collectively belong—is referred to generally and herein as the "macro network."

Mobile stations and macro base stations conduct communication sessions (e.g. voice calls and data sessions) over frequencies known as carriers, each of which may actually be a pair of frequencies, with the base station transmitting to the mobile station on one of the frequencies, and the mobile station transmitting to the base station on the other. This is known as frequency division duplex (FDD). The base-station-to-mobile-station link is known as the forward link, while the mobile-station-to-base-station link is known as the reverse link.

Furthermore, using a sector as an example of a coverage area, macro base stations may provide service in a given sector on one carrier, or on more than one. An instance of a particular carrier in a particular sector is referred to herein as a sector/carrier. In a typical CDMA system, using a configuration known as radio configuration 3 (RC3), a macro base station can, on a given sector/carrier, transmit forward-link data on a maximum of 64 distinct channels at any time, each corresponding to a unique 64-bit code known as a Walsh code. Of these channels, typically, 61 of them are available as traffic channels (for user data), while the other 3 are reserved for administrative channels known as the pilot, paging, and sync channels.

When a macro base station instructs a mobile station—that is on a given sector/carrier—to use a particular traffic channel for a communication session, the macro base station does so by instructing the mobile station to tune to one of the 61 traffic channels on that sector/carrier. It is over that assigned traffic channel that the macro base station will transmit forward-link data to the mobile station during the ensuing communication session. And, in addition to that forward-link channel, the traffic channel also includes a corresponding Walsh-coded reverse-link channel, over which the mobile station transmits data to the macro base station.

2. Low-Cost Internet Base Stations (LCIBs)

Many macro-network subscribers, including private consumers and small businesses, among others, in addition to having wireless service (which may include data service) for their mobile station (or mobile stations), also have high-speed (a.k.a. "broadband") Internet access through another communication channel, which may be cable-modem service, digital-subscriber-line (DSL) service, satellite-based Internet service, and/or some other option.

In an exemplary arrangement, a user may have a cable modem connected (a) via coaxial cable to a cable provider's network and (b) via Ethernet cable to a wireless (e.g. IEEE 802.11 (WiFi)) router. That router may include one or more Ethernet ports to which computers or other devices may be connected, and may also include wireless-access-point functionality, providing a WiFi packet-data interface to, as examples, laptop computers, digital video recorders (DVRs), appliances, and/or any other computing devices or their wireless network adapters.

To address gaps in macro-network coverage (e.g. in buildings) and for other reasons, macro-network service providers have recently begun offering consumers devices referred to herein as Low-Cost Internet Base Stations (LCIBs), which may also be referred to as femtocells (femto base stations, femto base transceiver stations (BTSs)), picocells (pico base stations, pico BTSs), microcells (micro base stations, micro BTSs), and by other names. Note that the aforementioned terms that end in "cell" may also be generally and herein used interchangeably to refer to the coverage area provided by the respective device. Note also that "low-cost" is not used herein as a limiting term; that is, devices of any cost may be categorized as LCIBs, though most LCIBs typically will be less expensive on average than most macro-network base stations.

A typical LCIB may be approximately the size of a desktop phone or WiFi access point, and is essentially a low-power, low-capacity version of a macro base station. Thus, a typical LCIB will use a normal power outlet, perhaps with a transformer providing a DC power supply. The LCIB may have a wired (e.g. Ethernet) or wireless (e.g. WiFi) connection with the user's router, and would thus have connectivity to the Internet and/or one or more other packet-data networks via the user's broadband connection. An LCIB may establish a virtual-private-network (VPN) connection over the Internet with an entity (e.g. a VPN terminator) on the wireless-service (macro-network) provider's core network, and thereby be able to securely communicate with the VPN terminator and other entities on that core network and beyond.

The LCIB also has a wireless-communication (e.g. CDMA) interface that is compatible with the user's mobile station(s), such that the LCIB may act as a micro base station, providing coverage on the wireless-service provider's network via the user's Internet connection. Usually, an LCIB will provide service on a single RF carrier (or on a single carrier per technology, where multiple technologies (i.e. CDMA, EV-DO) are supported), and also transmit what is known as a pilot beacon, which includes administrative messages and parameters that mobile stations can use to connect with the LCIB. And LCIBs typically include a Global Positioning System (GPS) receiver for use in receiving and decoding GPS signals, for use in determination of location, as well as for use in synchronizing operations with other LCIBs and with the macro network, based on timing information embedded in GPS signals. Typically, LCIBs have fairly comprehensive auto-configuration capabilities, such that they are largely "plug-and-play" to the user.

BRIEF DESCRIPTION OF THE DRAWINGS

Various exemplary embodiments are described herein with reference to the following drawings, wherein like numerals denote like entities.

DETAILED DESCRIPTION OF THE DRAWINGS

1. Overview

Figure 1A:
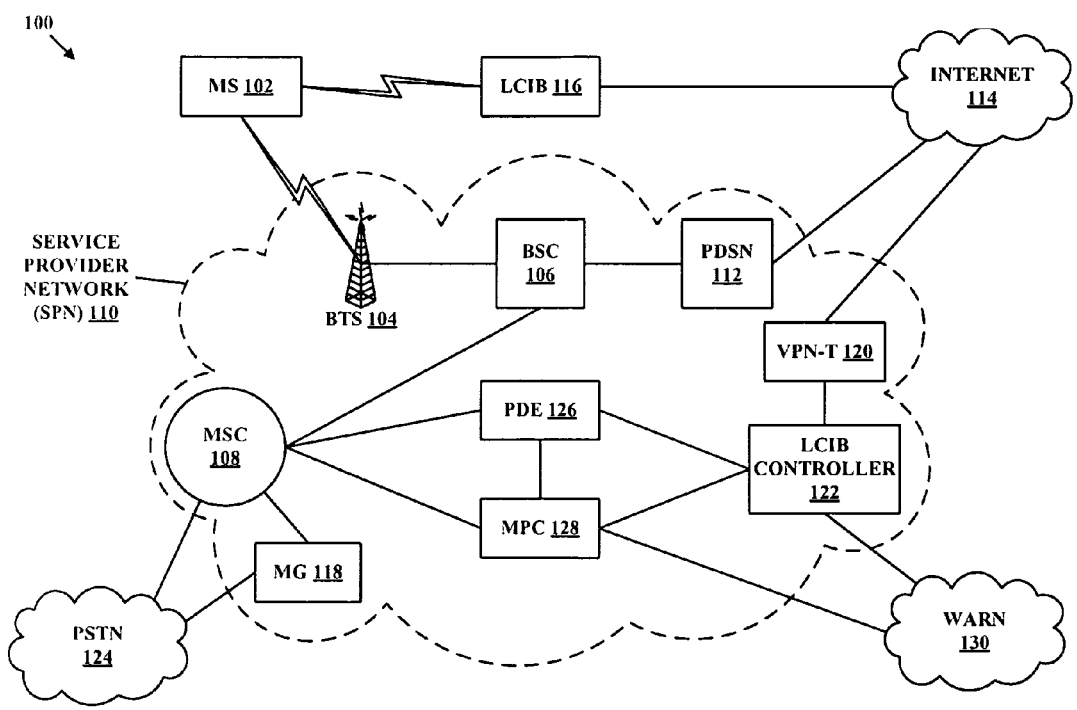
FIG. 1A is a simplified block diagram of a communication system, in accordance with exemplary embodiments.

As stated, an LCIB typically has an internal GPS receiver that it uses to receive GPS signals, for location and timing (i.e. synchronization), perhaps among other purposes. Upon being powered on or restarted, or in response to some other command or triggering event, an LCIB may use its GPS receiver to attempt to obtain an initial GPS fix, which typically involves receiving signals from multiple (e.g. three or four) satellites. The LCIB may then use those signals to compute its location. The LCIB may instead do so with the assistance of a network entity referred to here as a position determining entity (PDE). That is, the LCIB may use its Internet connection to send the data that it receives from the multiple GPS satellites to the PDE, which may then do the necessary calculations, and return a location (e.g. {latitude, longitude}) to the LCIB. The PDE may, instead of or in addition to sending the LCIB's location to the LCIB, store that location on the network, either on the PDE itself or on another entity.

In the example where the LCIB computes and stores—or receives and stores—its own location, the LCIB (or, in another example, one or more entities acting on behalf of the LCIB) may then use that location to acquire and/or confirm one or more operating parameters, such as a traffic-bearing carrier frequency (i.e. a carrier), a pseudorandom number (PN) offset, and/or any others. In one example, the LCIB may send a request for configuration information to a network entity, such as an LCIB controller, where the request includes the LCIB's location, perhaps among other values. The LCIB controller may then use that location to identify which carriers are licensed by the service provider in the location in which the LCIB resides.

The LCIB controller may then choose a licensed carrier, a PN offset, and/or any other configuration parameters, and send a configuration response to the LCIB over the Internet (i.e. over the VPN connection between a VPN terminator and the LCIB). Thereafter, the LCIB may operate using the operating parameters specified by the LCIB controller. This configuration response may also include additional information, such as an identification of nearby macro-network sectors, what carriers and PN offsets they use, etc. And in addition to formulating a request for auto-configuration information, the LCIB and/or network may also use the identified location for E911 purposes, and/or for any other suitable purpose(s).

And while the LCIB has a continuing need for receiving GPS signals, the need during general operation (i.e. after initial configuration) is not as stringent as it is during the time when the LCIB is attempting to acquire the initial GPS fix. In other words, it is generally easier to maintain a GPS lock than to acquire one. More particularly, after the initial fix, it may well be sufficient for the LCIB to receive a GPS signal from only one satellite. The LCIB would use this signal to keep its timing synchronized with that of the macro network. For any later calculation or re-calculation of location, however, the LCIB typically would need to be receiving signals from at least three GPS satellites.

The above-described auto-configuration process depends on the LCIB being able to acquire an initial GPS fix. Often, however, an LCIB is deployed in a location that does not get sufficient GPS reception for this to happen. For example, an LCIB may be deployed in the basement of a home, perhaps in order to make up for inadequate or non-existent macro-network coverage in the home, or perhaps because the homeowner wishes to take advantage of an unlimited usage plan via the LCIB, or perhaps for some other reason, or some combination of the foregoing. For a variety of reasons, the basement may be the only deployment option that is possible and/or acceptable to the homeowner who, perhaps collectively with others living there, may have one or more mobile stations that they intend to use in conjunction with the LCIB. As is typically the case, GPS reception in the user's basement may be very poor.

In accordance with the invention, rather than a given LCIB using its own GPS receiver to receive GPS signals from satellites and then derive its own location, the location of the LCIB is determined based on the location of a mobile station that is associated with the LCIB. In some embodiments, location information that reflects the mobile station's location may be transmitted to the LCIB over its backhaul connection—i.e. over its VPN/Internet connection with the macro network. In this manner, the LCIB can then achieve operational status (e.g. requesting/receiving operating parameters based on its location, verifying that a carrier is properly licensed in its location, achieving functional E911 status, etc.) in spite of the fact that the LCIB is deployed such that it does not receive a sufficient GPS signal to determine its own location.

The present invention may be carried out in a number of different ways. For example, the occurrence of a mobile station associating with the LCIB may be the triggering event that results in the location of the mobile station being determined, the location of the LCIB being determined based on that location, and the LCIB thereafter achieving operational status. This association may take the form of the mobile station registering with the LCIB; however, some LCIBs may be designed such that registration in its conventional sense (i.e. the process by which mobile stations become able to place and receive calls via a base station (such as an LCIB) with which they register) may not be possible or permitted until after the LCIB's auto-configuration sequence has completed, which would mean after the LCIB has successfully ascertained its location and then used that location to further configure itself as described herein.

As such, LCIBs arranged to carry out embodiments of the present invention may, as part of their configuration process, "listen" for any nearby mobile stations. The LCIB may also or instead be arranged to offer a sort of provisional registration, according to which mobile stations would be able to associate themselves with the LCIB for purposes of the LCIB's location being determined, but would not yet be able to place and receive calls via the LCIB, which would not yet have an approved carrier. And other possibilities exist, without departing from the invention.

In any event, once the mobile station associates with the LCIB, the LCIB may determine that it does not have a sufficient GPS signal, and responsively transmit a request over its backhaul connection to an entity such as an LCIB controller, a PDE, or some other suitable entity. That entity may respond to that request by causing the macro network to signal to the mobile station to trigger a process by which the location of the mobile station is ascertained (so the location of the LCIB can be determined based on that location). In another embodiment, the LCIB may respond to the determination that it has yet to identify its location by sending a message to the mobile station (perhaps during the association process) to request that the mobile station signal to the macro network to trigger the process by which the location of the mobile station is ascertained (so the location of the LCIB can be determined based on that location).

However the process is triggered, the mobile station's location may then be determined. This may involve the mobile station using its own internal GPS receiver to receive GPS signals, performing the necessary calculations to arrive at a set of GPS coordinates, and transmitting the coordinates to the macro network via a macro-network base station. In other examples, the mobile station may receive GPS signals from GPS satellites, and send that received raw data to the macro network (e.g. to the PDE); the macro network may then perform the calculations, perhaps also taking various macro-network-signal-strength measurements reported by the mobile station into account. In some examples, the PDE may send GPS-assistance data to the mobile station over the air interface between one or more macro-network base stations and the mobile station, to help the mobile station in acquiring a good GPS lock. And other examples of mobile-station-location determination are possible as well, without departing from the invention.

At this point, the macro network knows where the mobile station is, and also knows that the mobile station is associated with the LCIB. The latter condition could be accomplished in a number of ways. If the LCIB sends a message over its backhaul connection to trigger the mobile-station-location determination, that message could include (a) an identifier (e.g. MAC address, serial number, name, IP address) of the LCIB and (b) an identifier (e.g. mobile identification number (MIN), electronic serial number (ESN), etc.) of the mobile station. If such a message comes over the macro-network air interface from the mobile station, it could also include such identifiers.

At least one of those identifiers could be transmitted over the air interface from the LCIB to the mobile station and/or vice versa during the association process. In some embodiments, only one of the LCIB and the mobile station may identify themselves to the macro network during initiation of the mobile-station-location-determination process; in that case, an account association could be used to identify the other device; for example, a requesting mobile station could be correlated with a subscriber account that is also associated with an LCIB, and that LCIB could then be the subject of the herein-described process. And other examples are possible.

The mobile station's location, once determined, could then be set as the LCIB's location. Alternatively, the mobile station's location may be adjusted using dead-reckoning techniques known in the art. That is, the mobile station may include dead-reckoning hardware (e.g. pedometer, accelerometer, compass, pressure sensor (barometric altimeter), etc.). The mobile station may receive a location request from the LCIB, and then use that dead-reckoning hardware, along with dead-reckoning techniques known in the art, to compute direction and distance traveled between, as examples, (a) the location where the mobile station received the location request from the LCIB and (b) the mobile station's current location (e.g. where the mobile station acquired sufficient GPS and macro-network reception).

The mobile station or the macro network may use this dead-reckoning data to backtrack from the mobile station's determined location to arrive at an inferred/derived location of the LCIB. In other embodiments, these techniques may be used to ensure that the mobile station had traveled less than a threshold distance since last contact with the LCIB. In other embodiments, an elapsed-time safeguard may be used to ensure that the mobile station's last contact with the LCIB was recent enough to consider the mobile station's determined location to be a valid location setting for the LCIB. And other examples are possible, including any combination of these approaches, without departing from the invention.

In any event, once the LCIB's location has been determined, this location may be stored on one or more macro-network entities and/or transmitted to the LCIB over the LCIB's backhaul connection. If the LCIB receives the location, it may then use the location to request operating parameters as described. If the location is to be stored in another entity and not transmitted to the LCIB, that other entity may use the location to cause operating parameters to be sent to the LCIB. As one option, the location could be sent from the PDE to the LCIB controller, which would then store the location and also use it to identify operating parameters for the LCIB, and then send those operating parameters to the LCIB, perhaps along with the location itself.

In some embodiments, the location may be sent over the VPN/Internet backhaul connection to the LCIB, which may then use that location as an aid in acquiring a GPS fix that the LCIB may not have otherwise been able to acquire. In some embodiments, the herein-described process may be conducted a number of times such that, over time, an average location may be computed from multiple mobile-station locations, thus refining the LCIB's location. And other examples are possible, without departing from the invention.

In some embodiments, a mobile station may receive a location request from an LCIB, and then determine that it does not have adequate GPS reception at the moment. Once the mobile station later detects that it has GPS coverage, it may then trigger a process such as that described above. In one embodiment, the mobile station may display a message to its user, asking the user to go outside (or to a window, etc.) for a few minutes in order to acquire a GPS fix and macro-network reception for its LCIB. This could be limited to mobile stations on the LCIB's list of authorized, home, preferred, etc. mobile stations. Once the LCIB received its location (and/or operating parameters) via the backhaul, it could send the mobile station an acknowledgement, which the mobile station could use to indicate success to the user and/or remove the message. And other possibilities exist as well, without departing from the invention.

Thus, in accordance with exemplary embodiments, an LCIB that is deployed in a location that results in it having insufficient GPS reception for acquiring an initial GPS fix can acquire the necessary location information and/or operating parameters via its backhaul connection with the involvement of an associated mobile station. The present invention thus obviates cumbersome, unsightly, and potentially ineffective external GPS antennas mounted on the LCIB, as well as detailed location-data entry by an inconvenienced and/or inexperienced user of the LCIB, which could lead to data-reliability and customer-dissatisfaction problems, among other problems.

2. Exemplary Architecture a. An Exemplary Communication System

FIG. 1A is a simplified block diagram of a communication system, in accordance with exemplary embodiments. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1A, a communication system 100 includes a mobile station (MS) 102, a macro BTS 104, a base station controller (BSC) 106, a mobile switching center (MSC) 108, a service provider network (SPN) 110, a packet data serving node (PDSN) 112, the Internet 114, an LCIB 116, a media gateway 118, a VPN terminator (VPN-T) 120, an LCIB controller 122, a public switched telephone network (PSTN) 124, a positioning determining entity (PDE) 126, a mobile positioning center (MPC) 128, and a wide-area reference network (WARN) 130. And additional entities could be present, such as additional mobile stations in communication with BTS 104, additional entities in communication with Internet 114 and/or PSTN 124, etc. Also, there could be one or more devices and/or networks making up at least part of one or more communication links. For example, there could be one or more routers, cable modems, and/or other devices or networks on the link between LCIB 116 and Internet 114.

Mobile station 102 may be any mobile device arranged to carry out the mobile-station functions described herein. As such, mobile station 102 may include a user interface, a wireless-communication interface, a location interface such as a GPS-enabled chipset, a processor, and data storage comprising instructions executable by the processor for carrying out those mobile-station functions. The user interface may include buttons, a touch-screen, a microphone, and/or any other elements for receiving inputs, as well as a speaker, one or more displays, and/or any other elements for communicating outputs.

The wireless-communication interface may include an antenna and a chipset suitable for communicating with one or more macro base stations and/or one or more LCIBs over suitable air interfaces. For example, the chipset could be suitable for CDMA communication. The chipset or wireless-communication interface in general may also be able to communicate with other types of networks and devices, such as EV-DO networks, Wi-Fi networks, Bluetooth devices, and/or one or more additional types of networks and devices. The wireless-communication interface may also include the GPS-enabled chipset and/or other location module(s). The GPS-enabled chipset, processor, and data storage may be any suitable components known to those in the art. As examples, mobile station 102 could be or include a cell phone, a PDA, a computer, a laptop computer, a hybrid CDMA/EV-DO device, and/or a multi-mode cellular/Wi-Fi device.

Macro BTS 104 may be any network element arranged to carry out the macro-BTS functions described herein. As such, macro BTS 104 may include a communication interface, a processor, and data storage comprising instructions executable by the processor to carry out those macro-BTS functions. The communication interface may include one or more antennas, chipsets, and/or other components for providing one or more CDMA coverage areas such as cells and sectors, for communicating with mobile stations such as mobile station 102 over an air interface. The communication interface may also include one or more wired (e.g. Ethernet) and/or wireless (e.g. WiFi) interfaces for communicating with at least BSC 106.

BSC 106 may be any network element arranged to carry out the BSC functions described herein. As such, BSC 106 may include a communication interface, a processor, and data storage comprising instructions executable by the processor to carry out those BSC functions. The communication interface may include one or more wired and/or wireless interfaces for communicating with at least macro BTS 104, MSC 108, and PDSN 112. In general, BSC 106 functions to control one or more macro BTSs such as macro BTS 104, and to provide those one or more macro BTSs with connections to devices on service provider network 110.

Note that the combination of macro BTS 104 and BSC 106 may be considered a macro base station. However, macro BTS 104 or BSC 106 could, taken alone, be considered a macro base station as well. Furthermore, a macro base station may be considered to be either or both of those devices, and perhaps make use of one or more functions provided by MSC 108, PDSN 112, and/or any other entity, without departing from the invention. And it should be noted that the macro network and/or the LCIB(s) described herein may operate according to CDMA, EV-DO, iDEN, TDMA, AMPS, GSM, GPRS, UMTS, EDGE, WiMAX (e.g., IEEE 802.16), LTE, microwave, satellite, MMDS, Wi-Fi (e.g., IEEE 802.11), Bluetooth, infrared, and/or any other wireless technology or technologies now known or later developed.

MSC 108 may be any networking element arranged to carry out the MSC functions described herein. Thus, MSC 108 may include a communication interface, a processor, and data storage comprising instructions executable by the processor to carry out those MSC functions. The communication interface may include one or more wired and/or wireless interfaces for communicating with at least BSC 106, media gateway 118, PSTN 124, PDE 126, and MPC 128. In general, MSC 108 acts as a switch between PSTN 124 and BSCs such as BSC 106, and may also act as a switch between PSTN 124 and MG 118—in general, facilitating communication between SPN 110 and PSTN 124, which may be the public switched telephone network.

Service-provider network 110 may encompass all of the network elements depicted in FIG. 1A as being included in its dashed-cloud shape. In general, there may be more and/or different communication links among entities within service-provider network 110, and there may be more and/or different connections between service-provider network 110 and outside entities. Furthermore, there may be a core packet network (not depicted) making up part of service-provider network 110, which may enable devices therein to communicate with each other. There may also be one or more other packet-data networks and/or elements, one or more circuit-switched networks and/or elements, one or more signaling networks and/or elements, and/or one or more of any other suitable network(s) and/or element(s).

PDSN 112 may be any networking element arranged to carry out the PDSN functions described herein. As such, PDSN 112 may include a communication interface, a processor, and data storage comprising instructions executable by the processor for carrying out those PDSN functions. The communication interface may include one or more wired and/or wireless interfaces for communicating with at least BSC 106 and Internet 114. In general, PDSN 112 acts as a network access server between Internet 114 and BSCs such as BSC 106, facilitating packet-data communication between mobile stations and Internet 114, via macro base stations.

Internet 114 may be the well-known global packet-data network generally referred to as the Internet. However, Internet 114 may also be or include one or more other packet-data networks, without departing from the scope and spirit of the present invention. As such, Internet 114 may include one or more wide area networks, one or more local area networks, one or more public networks, one or more private networks, one or more wired networks, one or more wireless networks, and/or one or more networks of any other type. Devices in communication with Internet 114 may exchange data using a packet-switched protocol such as the Internet Protocol (IP), and may be identified by an address such as an IP address.

LCIB 116 may be any computing and communication device arranged to carry out the LCIB functions described herein. As such, LCIB 116 may include a communication interface, a processor, and data storage comprising instructions executable by the processor for carrying out those LCIB functions. The communication interface may include a wireless interface for communicating with one or more mobile stations according to a protocol such as CDMA (and/or one or more other technologies), as well as an Ethernet or WiFi interface for communicating with a device such as a router and/or a cable modem. LCIB 116 may also have a GPS receiver and/or other location module. LCIB 116 is also described in connection with FIG. 2.

Media gateway (MG) 118 may be any networking element arranged to carry out the MG functions described herein. As such, MG 118 may include a communication interface, a processor, and data storage comprising instructions executable by the processor for carrying out those media-gateway functions. The communication interface may include both a circuit-switched interface and a packet-switched interface. MG 118 may (a) receive packet-based communications from SPN 110, convert those to circuit-switched communications, and pass them to PSTN 124 (or MSC 108) and (b) receive circuit-switched communications from PSTN 124 (or MSC 108), convert those to packet-based communications, and pass them to SPN 110.

VPN terminator 120 may be any networking element arranged to carry out the VPN-terminator functions described herein. Thus, VPN terminator 120 may include a communication interface, a processor, and data storage comprising instructions executable by the processor for carrying out those VPN-terminator functions. The communication interface may include one or more wired and/or wireless interfaces for communicating with at least LCIB controller 122 and Internet 114. In general, VPN terminator 120 functions to establish secure VPN connections over Internet 114 with LCIBs such as LCIB 116, enabling the LCIBs to securely communicate with devices on SPN 110, such as LCIB controller 122, and perhaps beyond.

LCIB controller 122 may be any networking element arranged to carry out the LCIB-controller functions described herein. Thus, LCIB controller 122 may include a communication interface, a processor, and data storage comprising instructions executable by the processor for carrying out those LCIB-controller functions. The communication interface may include one or more wired and/or wireless interfaces for communicating with at least VPN terminator 120, PDE 126 and/or MPC 128, WARN 130, as well as perhaps one or more other entities on SPN 110 and beyond. Among other functions, LCIB controller 122 communicates via VPN terminator 120 with LCIBs such as LCIB 116. LCIB controller 122 may receive requests from various LCIBs for configuration data, and those requests may include, among other values, indications of the LCIBs' respective locations. LCIB controller 122 may also be operable to select various operational parameters for LCIBs (e.g. carrier, PN offset, whether to broadcast a pilot-beacon, contents of any pilot beacon to be broadcast, transmission-power level), and to transmit those parameters to LCIBs, perhaps along with other configuration data and messaging.

PDE 126 may be any networking element arranged to carry out the PDE functions described herein. Thus, PDE 126 may include a communication interface, a processor, and data storage comprising instructions executable by the processor for carrying out those PDE functions. The communication interface may include one or more wired and/or wireless interfaces for communicating with at least MSC 108, LCIB controller 122, MPC 128, along with perhaps one or more other entities on SPN 110 and beyond.

In general, PDE 126, among possibly other functions may receive requests from mobile stations, LCIBs, etc. for assistance with determining location. These requests may include data received by the requesting entity from one or more GPS satellites. PDE 126 may use this data to compute a location, and return that location to the requesting entity, perhaps in addition to storing that location on PDE 126, MPC 128, LCIB controller 122, and/or on one or more other network entities. PDE 126 may also assist devices such as mobile stations and LCIBs in computing their own location, by providing GPS assistance data to those devices.

MPC 128 may be any networking element arranged to carry out the MPC functions described herein. Thus, MPC 128 may include a communication interface, a processor, and data storage comprising instructions executable by the processor for carrying out those MPC functions. The communication interface may include one or more wired and/or wireless interfaces for communicating with at least MSC 108, LCIB controller 122, PDE 126, WARN 130, along with perhaps one or more other entities on SPN 110 and beyond. In general, MPC 128 may function to store current locations of mobile stations (perhaps received from PDE 126), and to respond to requests for particular mobile stations' locations from, for example, MSC 108. MPC 128 may be arranged to receive location information, such as LCIB-location information, from LCIB controller 122, and then store that information.

WARN 130 may be any one or any combination of devices, network entities, networks, etc. collectively arranged to collect GPS information from terrestrial base stations that are communicating with GPS satellites, and to pass that information to one or more network entities (e.g. PDE 126, MPC 128, LCIB controller 122) described herein, for the purposes of enabling those network entities to pass some or all of that information to various devices (e.g. mobile stations and/or LCIBs), to help those devices determine their location. As such, WARN 130 may be connected via a suitable communication path with MPC 128, PDE 126, and/or LCIB controller 122, among other possibilities.

b. An Exemplary Scenario

Figure 1B:
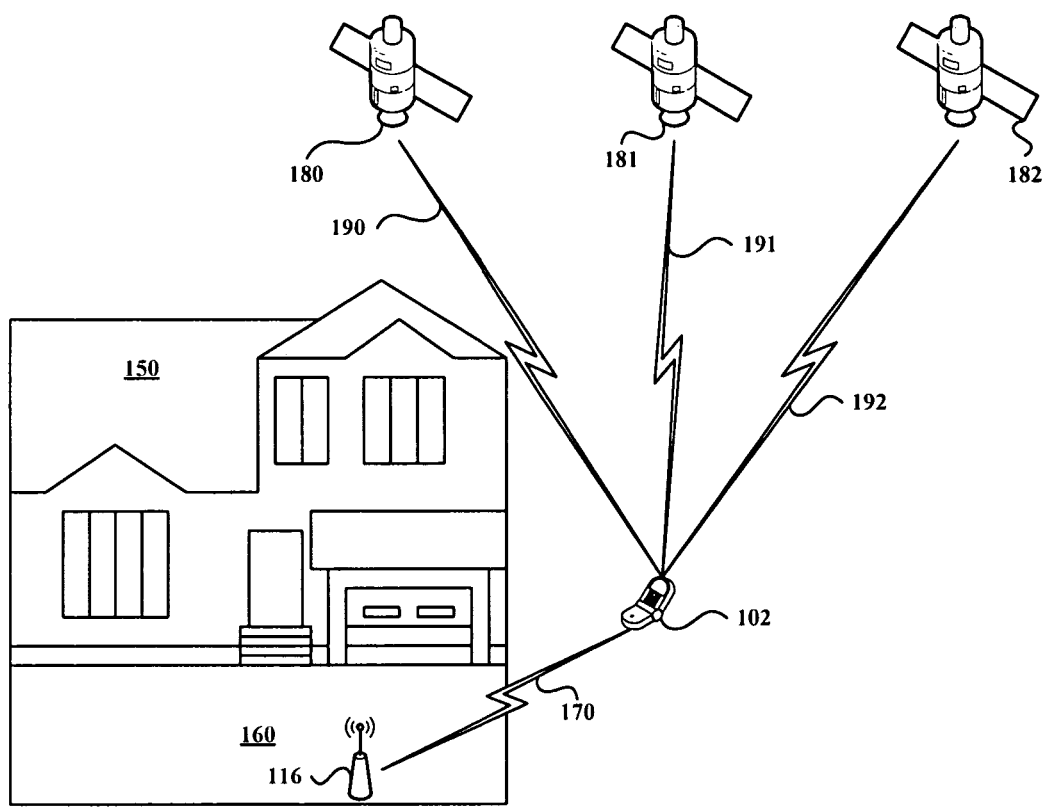
FIG. 1B is a simplified block diagram of an arrangement of communication entities, in accordance with exemplary embodiments.

FIG. 1B depicts an exemplary arrangement of communication elements, in which embodiments of the present invention may be carried out. Note that the arrangement shown in FIG. 1B is by way of example and not by way of limitation: additional and/or different elements could be present in a given scenario, without departing from the invention.

FIG. 1B depicts a house 150 having a basement 160 in which LCIB 116 has been deployed. Mobile station 102 and LCIB 116 communicate over a CDMA air interface 170, though any other wireless technology could be used. Mobile station 102 is shown as being situated outside house 150, within sight (i.e. line of sight) of GPS satellites 180-182. Mobile station 102 receives a GPS signal 190 from satellite 180, a GPS signal 191 from satellite 181, and a GPS signal 192 from satellite 182. Note that mobile station 102 could receive signals from a different number of GPS satellites, and that three is provided by way of example.

In the scenario depicted in FIG. 1B, it could well be the case that LCIB 116 can only faintly detect a signal from one of the GPS satellites 180-182, which would be deployed in orbit. Mobile station 102, however, when situated outside house 150 (or on the main floor, top floor, near a window, etc.), can receive signals from enough GPS satellites to obtain a good GPS fix using its internal GPS receiver. In some embodiments, mobile station 102 may communicate via a macro base station (not shown) with PDE 126 (not shown) for aid in determining its location.

c. An Exemplary LCIB

Figure 2:
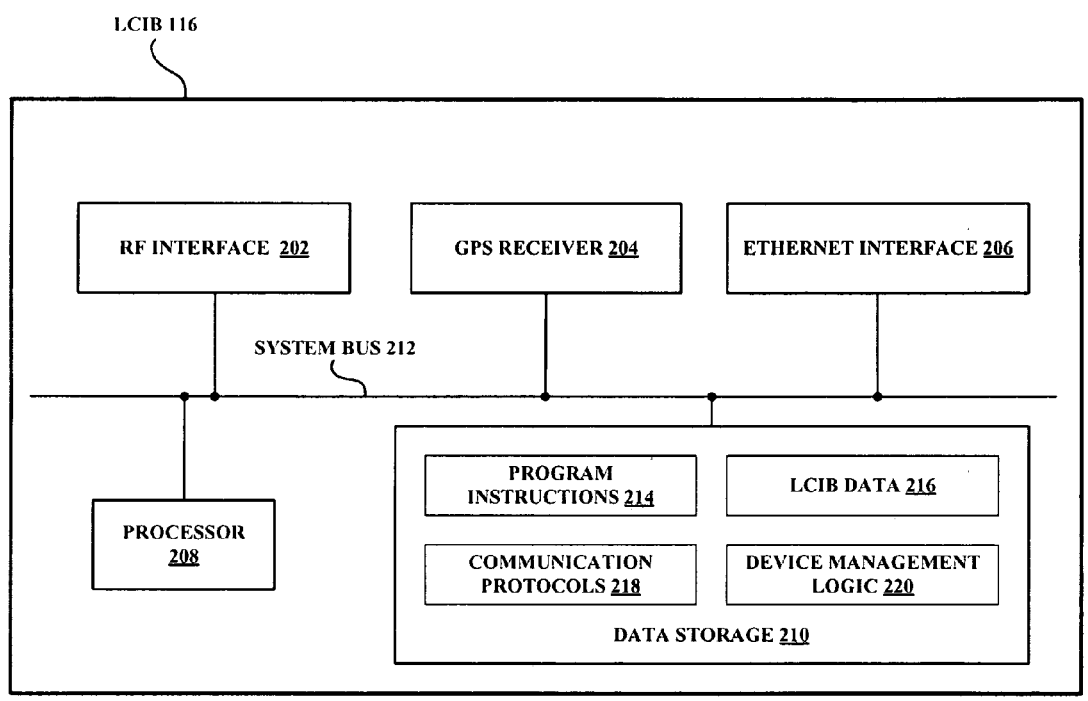
FIG. 2 is a simplified block diagram of an LCIB, in accordance with exemplary embodiments.

FIG. 2 depicts an exemplary diagram of LCIB 116, which includes an RF interface 202, a GPS receiver 204, an Ethernet interface 206, a processor 208, and data storage 210, all communicatively linked by a system bus 212. Note that LCIB 116 could have additional and/or different components, and that this structure is provided by way of example.

RF interface 202 may include one or more antennas, one or more chipsets, a set of one or more channel elements, and/or one or more other components suitable for providing a wireless coverage area according to a wireless-communication protocol such as CDMA (and/or one or more other technologies). GPS receiver 204 may be any known or hereafter-developed GPS receiver, suitable for receiving and decoding GPS signals for location and timing purposes, perhaps among other purposes. In some embodiments, an LCIB may have a location module in addition to or instead of a GPS receiver.

Ethernet interface 206 may provide a wired packet-data interface for communicating with a device such as a router or cable modem. Processor 208 may comprise multiple (e.g., parallel) processors, such as a general purpose microprocessor and/or a discrete digital signal processor. The data storage 210 may take various forms, in one or more parts, such as a non-volatile storage block and/or a removable storage medium, and may include (a) program instructions 214 executable by processor 208 for carrying out the LCIB functions described herein, (b) LCIB data 216, which may be any operational data or other type of data stored for use by LCIB 116, (c) communication protocols 218, facilitating and enabling communication with one or more other devices, and (d) device management logic 220, perhaps for memory and file management.

3. Exemplary Operation a. A First Exemplary Method

Figure 3:
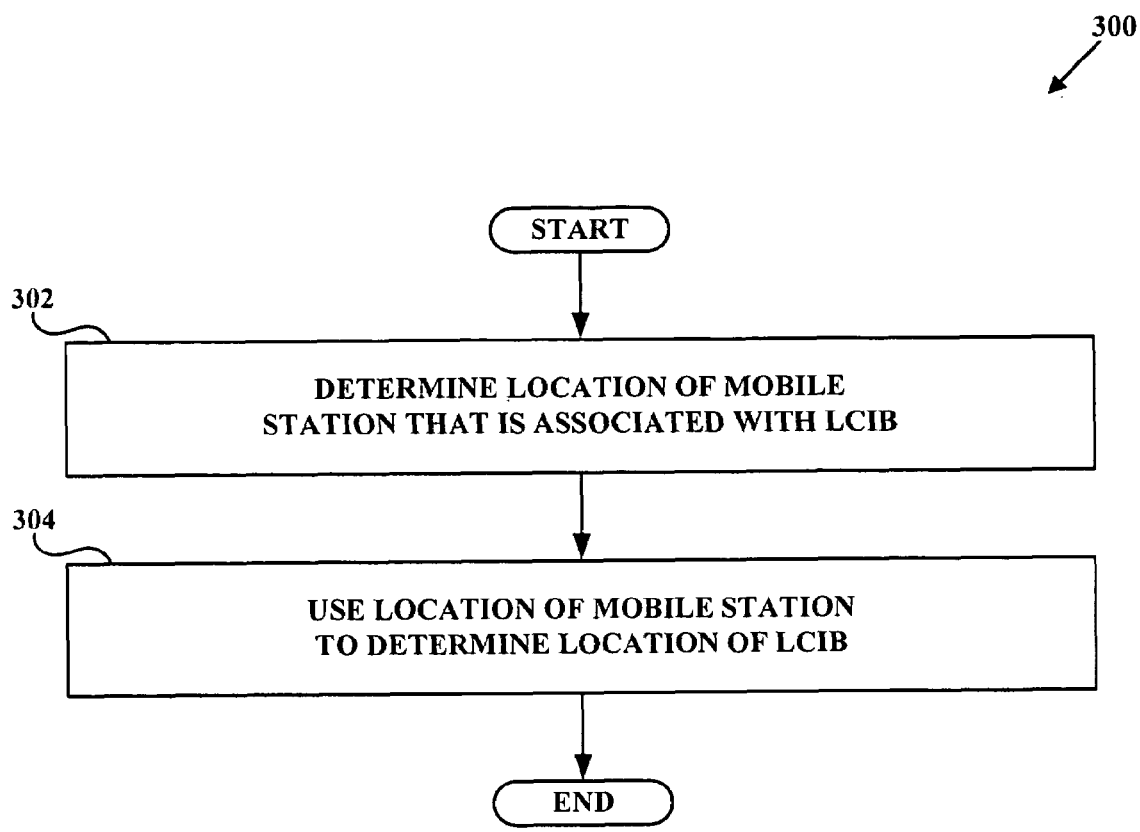
FIG. 3 is a flowchart of a method, in accordance with exemplary embodiments.

FIG. 3 depicts a flowchart of an exemplary method, in accordance with an exemplary embodiment. In particular, FIG. 3 depicts a method 300. As shown in FIG. 3, method 300 begins at step 302, when a location of a mobile station that is associated with an LCIB is determined. At step 304, the location of the mobile station is used to determine a location of the LCIB. These steps are further explained in the following subsections. And it should be noted that method 300 may be carried out by any combination of LCIB 116, mobile station 102, LCIB controller 122, PDE 126, MPC 128, BTS 104, BSC 106, MSC 108, WARN 130, VPN terminator 120, one or more other entities described herein, and/or one or more other entities not described herein, without departing from the scope and spirit of the present invention.

i. Determine Location of Associated Mobile Station

At step 302, a location of mobile station 102 is determined, where mobile station 102 is associated with LCIB 116. Prior to carrying out step 302, mobile station 102 may come within range—or be powered on within range—of LCIB 116, and responsively associate with LCIB 116. This may involve registration, or perhaps some sort of provisional registration for helping LCIB 116 ascertain its own location, or perhaps some other possibility. This association may involve a one-way or two-way exchange of identifiers between mobile station 102 and LCIB 116. Thus, LCIB 116 may send an identifier of itself to mobile station 102; mobile station 102 may send an identifier of itself to LCIB 116; or both of the foregoing could occur.

Furthermore, the combination of steps 302 and 304 could be carried out in response to detecting that mobile station 102 has associated with LCIB 116. This step of detecting could be carried out by mobile station 102, LCIB 116, a macro-network entity residing "behind" LCIB 116, and/or some other entity or entities. In one embodiment, LCIB 116 detects that (a) mobile station 102 has associated with LCIB 116 and (b) LCIB 116 is not receiving a sufficient GPS signal for acquiring an initial GPS fix, and responsively sends a location request.

In one embodiment, LCIB 116 may send the location request to mobile station 102 over a first air interface (e.g. a CDMA air interface). In response to receiving the location request, mobile station 102 may then communicate with the macro network over a second air interface (e.g. a CDMA air interface) to initiate a location-determination session with the macro network (e.g. PDE 126 and/or MPC 128) for determining the location of mobile station 102.

Note that mobile station 102 may need both a sufficient GPS signal and sufficient macro-network coverage to engage in the above-referenced location-determination session. As such, the above-described step of mobile station 102 communicating with the macro network over the second air interface to initiate the location-determination session may involve mobile station 102: (a) checking whether it has a sufficient GPS signal and sufficient macro-network coverage for engaging in the location-determination session; (b) in response to determining that it does not have at least one of a sufficient GPS signal and sufficient macro-network coverage, caching the location request; and (c) after caching the location request, later determining that it has both a sufficient GPS signal and sufficient macro-network coverage, and responsively engaging in the location-determination session.

In other embodiments, LCIB 116 may send the location request over its backhaul connection to the macro network (e.g. to LCIB controller 122) rather than sending the location request over an air interface to mobile station 102. In response to receiving the location request, the macro network may then communicate with mobile station 102 over an air interface (e.g. a CDMA air interface) to initiate the location-determination session with mobile station 102. And other examples are possible as well.

Regardless of the manner in which the process of determining the location of mobile station 102 is initiated, that process may take a variety of forms. In one embodiment, mobile station 102 uses its own internal GPS receiver to determine its location. Mobile station 102 may then transmit that location to the macro network over the air interface.

In another embodiment, mobile station 102 uses its GPS receiver to receive GPS data (i.e. pseudorandom code, ephemeris data, and almanac data) from multiple satellites. Mobile station 102 may then transmit that received GPS data over the air interface to the macro network (e.g. to PDE 126), which then uses that data, perhaps along with other data (e.g. macro-network-signal-strength measurements taken by mobile station 102) to compute the location of mobile station 102. And other examples are possible without departing from the invention, such as the raw GPS data being transmitted to LCIB 116 over the backhaul VPN connection, such that LCIB 116 could then perform the necessary calculations of mobile station 102's location, perhaps alone or with help from one or more macro-network entities (such as PDE 126).

And different possibilities exist as well with respect to how to arrive at the result where the macro network is making the proper correlation between LCIB 116 and its associated mobile station 102 for the purposes of carrying out embodiments of the present invention. As stated, either or both of LCIB 116 and mobile station 102 may transmit a self-identifier to the other entity as part of, contemporaneously with, or perhaps after the above-described association process. As an example, the identifier transmission could occur as a result of the herein-described LCIB-location process being carried out. And other possibilities exist as well.

In any event, either or both of LCIB 116 and mobile station 102 may transmit the necessary identifier(s) to the macro network. Either entity could format a message to the macro network that includes both identifiers. Or either entity could format a message that includes an identifier for only the other entity (i.e. in a body of the message), while the message itself could identify the sender and thus the other associated entity. And other possibilities exist as well without departing from the invention. When correlating mobile station 102 to LCIB 116 for carrying out step 304 (described below), the macro network may use at least one such identifier to identify at least one of LCIB 116 and mobile station 102.

As alluded to above, in some embodiments, step 302 may involve transmitting location information—that reflects or pertains to the location of mobile station 102—to LCIB 116 from the macro network over LCIB 116's VPN/Internet backhaul connection. This information could be mobile station 102's actual location, but could just as well be raw GPS data from multiple satellites, or some other possibility, without departing from the invention.

ii. Use Mobile-Station Location to Determine LCIB Location

At step 304, the location of mobile station 102—which was determined above in step 302 by one or more entities—is used to determine the location of LCIB 116. As stated above, an identifier of LCIB 116 and/or an identifier of mobile station 102 may be used to correlate one to the other, to ensure that the right mobile station's location is used as the basis for determining the location of the right LCIB. In other embodiments, an account association may be used to correlate mobile station to LCIB. Thus, the macro network may receive a message from a mobile station indicating that the mobile station is requesting that its location be used as the basis for determining an LCIB's location; the macro network may responsively look up account information for that mobile station to identify a correlated LCIB. And other examples are possible as well, without departing from the invention.

With respect to using the location of mobile station 102 to determine the location of LCIB 116, this may be as simple as setting the location of LCIB 116 equal to the determined location of mobile station 102. This may be considered close enough, and may well reflect reality, such as in a situation where a mobile station is located vertically above (e.g. on a higher floor) than an LCIB, and thus at the same {latitude, longitude}. In other embodiments, mobile station 102 may, from a time when it first (or last) receives a communication from LCIB 116, use dead-reckoning hardware, software, techniques, etc. to compute direction and distance from its location at the time of that communication to its location at the time of its location being actually determined (i.e. by itself using GPS or aided by the macro-network etc.). This may provide an offset that mobile station 102 or some other entity could use to backtrack to (i.e. infer) the actual location of LCIB 116. And other possibilities exist as well.

In other embodiments, dead-reckoning techniques could be used to compute a distance traveled since first (or last or some other) communication from LCIB 116; and then one or more entities could compare that distance with a threshold distance, and only use the mobile station's location as a basis for determining the LCIB's location if the distance traveled is less than the threshold. In a similar manner, a time-elapsed threshold could be used to ensure that the mobile station had been in contact with the LCIB within a short enough amount of time prior to the mobile station's location being determined. And other possibilities exist as well.

Once the location of LCIB 116 is determined, either LCIB 116 itself or some other entity may use that location to obtain at least one operational parameter (carrier, PN offset, etc.) for LCIB 116 to use. These one or more operational parameters could then be sent—perhaps along with the LCIB's location—from the macro network to the LCIB over the backhaul connection.

In some embodiments, the above-described process may be carried out multiple times. Each time the process is carried out, the LCIB location that is considered to be the result of that iteration may reflect an average of a most-recently-determined LCIB location and one or more previously-determined LCIB locations. In this way, the location of LCIB 116 may be refined again and again, which may improve the accuracy of the overall process.

b. A Second Exemplary Method

Figure 4:
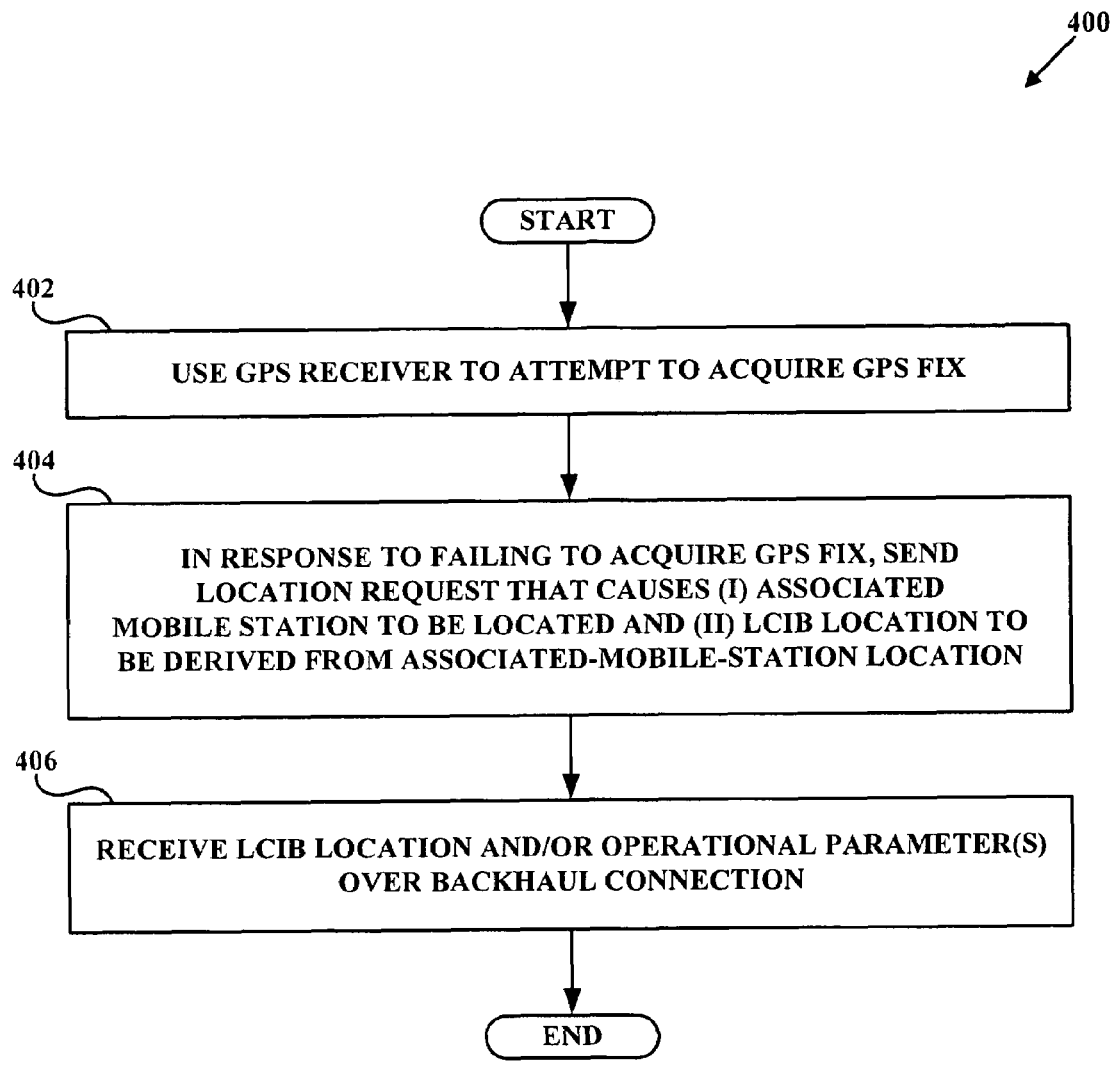
FIG. 4 is a flowchart of a method, in accordance with exemplary embodiments.

FIG. 4 is a flowchart of a second exemplary method, in accordance with an exemplary embodiment. In particular, FIG. 4 depicts a method 400, which may be carried out by an LCIB such as LCIB 116, or perhaps by an LCIB in cooperation with one or more other entities such as mobile station 102, VPN terminator 120, LCIB controller 122, PDE 126, MPC 128, and/or any other(s). Method 400 is similar to method 300, and thus is not described in as great of detail.

As shown in FIG. 4, method 400 begins at step 402, when LCIB 116 uses its GPS receiver to attempt to acquire a GPS fix. At step 404, in response to failing to acquire the GPS fix (perhaps after expiration of a timeout period), LCIB 116 sends a location request to at least one of the macro network (e.g. LCIB controller 122) and mobile station 102, which is associated with LCIB 116. This causes the location of mobile station 102 to be determined by at least one of mobile station 102 and the macro network (e.g. PDE 126); moreover, it further causes the location of LCIB 116 to be determined by at least one of LCIB 116 and the macro network (e.g. PDE 126) based on the location of mobile station 102. At step 406, LCIB 116 receives over the backhaul connection at least one of (a) its location and (b) an operational parameter identified at least in part based on the location of LCIB 116.

4. CONCLUSION

Various exemplary embodiments have been described above. Those skilled in the art will understand, however, that changes and modifications may be made to those examples without departing from the scope of the claims.

The invention claimed is:

1. A method comprising:
  a low cost Internet base station (LCIB), wherein the LCIB has a backhaul connection to a macro network, detecting that (i) a mobile station has associated with the LCIB and (ii) the LCIB is not receiving a sufficient Global Positioning System (GPS) signal for acquiring an initial GPS fix, and responsively sending a location request to at least one network entity;
  the at least one network entity receiving the location request, and responsively (i) determining a location of the mobile station, (ii) using the location of the mobile station to determine a location of the LCIB, and (iii) transmitting to the LCIB over the backhaul connection at least one of (a) location information reflecting the location of the LCIB and (b) an LCIB operational parameter identified at least in part based on the determined location of the LCIB.

2. The method of claim 1, wherein transmitting the location information over the backhaul connection comprises transmitting the location information over a virtual-private-network (VPN) connection.

3. The method of claim 1, wherein the mobile station having associated with the LCIB comprises the mobile station having registered with the LCIB.

4. The method of claim 1, wherein sending the location request comprises sending the location request to the mobile station over a first air interface, wherein, in response to receiving the location request, the mobile station communicates with a macro network over a second air interface to initiate a location-determination session with the macro network for determining the location of the mobile station.

5. The method of claim 4, wherein the mobile station communicating with the macro network over the second air interface to initiate the location-determination session comprises:
  the mobile station checking whether it has a sufficient GPS signal and sufficient macro-network coverage for engaging in the location-determination session;
  in response to determining that it does not have at least one of a sufficient GPS signal and sufficient macro-network coverage for engaging in the location-determination session, the mobile station caching the location request; and
  after caching the location request, the mobile station later determining that it has both a sufficient GPS signal and sufficient macro-network coverage for engaging in the location-determination session, and responsively engaging in the location-determination session.

6. The method of claim 1, wherein sending the location request comprises sending the location request to the macro network over the backhaul connection, wherein, in response to receiving the location request, the macro network communicates with the mobile station over an air interface to initiate a location-determination session with the mobile station for determining the location of the mobile station.

7. The method of claim 1, wherein determining the location of the mobile station comprises the mobile station using a Global Positioning System (GPS) receiver to determine the location of the mobile station, the method further comprising the mobile station transmitting the location of the mobile station to a macro network over an air interface.

8. The method of claim 1, wherein determining the location of the mobile station comprises the mobile station using a Global Positioning System (GPS) receiver to receive GPS data, the method further comprising:
  the mobile station transmitting the GPS data to the macro network over an air interface; and
  the macro network using at least the GPS data to compute the location of the mobile station.

9. The method of claim 1, further comprising:
  at least one of the LCIB and the mobile station transmitting at least one of an identifier of the LCIB and an identifier of the mobile station to the macro network,
  wherein using the location of the mobile station to determine the location of the LCIB comprises using at least one transmitted identifier to identify at least one of the LCIB and the mobile station.

10. The method of claim 1, wherein using the location of the mobile station to determine the location of the LCIB comprises using an account association to identify at least one of the LCIB and the mobile station.

11. The method of claim 1, wherein using the location of the mobile station to determine the location of the LCIB comprises setting the location of the LCIB equal to the location of the mobile station.

12. The method of claim 1, wherein using the location of the mobile station to determine the location of the LCIB comprises deriving the location of the LCIB from the location of the mobile station and a set of dead-reckoning data.

13. The method of claim 1, wherein using the location of the mobile station to determine the location of the LCIB comprises using the location of the mobile station to determine the location of the LCIB only if (a) the mobile station has traveled less than a threshold distance since communicating with the LCIB and/or (b) the mobile station has communicated with the LCIB within a threshold timeout period.

14. The method of claim 1, carried out multiple times, wherein the location of the LCIB that is determined each time reflects an average of (a) a location determined that time and (b) a location determined in connection with at least one previous time.

15. A method carried out by a low-cost Internet base station (LCIB), the LCIB comprising a Global Positioning System (GPS) receiver and a backhaul connection with a macro network, the method comprising:
  using the GPS receiver to attempt to acquire a GPS fix;
  in response to failing to acquire the GPS fix, sending a location request to at least one of the macro network and a mobile station that is associated with the LCIB, wherein sending the location request causes (a) a location of the mobile station to be determined by at least one of the mobile station and the macro network and (b) a location of the LCIB to be determined by at least one of the LCIB and the macro network based on the location of the mobile station; and
  receiving over the backhaul connection at least one of (a) the location of the LCIB and (b) an LCIB operational parameter identified at least in part based on the location of the LCIB.

16. A low-cost Internet base station (LCIB) comprising:
a communication interface for providing an air interface to at least one mobile station;
a location module comprising a Global Positioning System (GPS) receiver;
a backhaul connection with a macro network;
a processor; and
data storage comprising instructions executable by the processor to:
  use the GPS receiver to attempt to acquire a GPS fix;
  in response to failing to acquire the GPS fix, send a location request to at least one of the macro network and a mobile station that is associated with the LCIB, wherein sending the location request causes (a) a location of the mobile station to be determined by at least one of the mobile station and the macro network and (b) a location of the LCIB to be determined by at least one of the LCIB and the macro network based on the location of the mobile station; and
  receive over the backhaul connection at least one of (a) the location of the LCIB and (b) an LCIB operational parameter identified at least in part based on the location of the LCIB.

* * * * *